United States Patent [19]

Hsiung

[11] 3,741,401
[45] June 26, 1973

[54] PERFORATED TUBE MODULE FOR LIQUID TREATMENT
[75] Inventor: Andrew K. Hsiung, Corvallis, Oreg.
[73] Assignee: Neptune Microfloc Incorporated, Corvallis, Oreg.
[22] Filed: Nov. 26, 1971
[21] Appl. No.: 202,228

[52] U.S. Cl................. 210/519, 210/521, 210/532
[51] Int. Cl.......................................... B01d 21/00
[58] Field of Search..................... 210/83, 521, 523, 210/532, 519, 522

[56] References Cited
UNITED STATES PATENTS

| | | | |
|---|---|---|---|
| 3,385,439 | 5/1968 | Bach | 210/83 |
| 3,491,892 | 1/1970 | McCann | 210/521 |
| 2,573,615 | 10/1951 | Seailles | 210/521 |
| 3,666,112 | 5/1972 | Pielkenrood | 210/521 |

Primary Examiner—Samih N. Zaharna
Assistant Examiner—T. A. Granger
Attorney—Stephen W. Blore, Arthur L. Whinston et al.

[57] ABSTRACT

A device for liquid treatment, such as for separating settleable particles from liquid, comprises a set of spaced apart generally parallel inclined perforated sheets forming settling compartments therebetween. Means are provided to distribute an influent liquid so as to impinge substantially uniformly on the first of said sheets and thereafter flow through the perforations therein from the first of such settling compartments uniformly and sequentially to the last thereof. Withdrawal means for the effluent are positioned adjacent the top of the last settling compartment, whereby the liquid flows upwardly through the compartments as it passes sequentially from the first to the last. The particles in the liquid settle out on the sheets whence they slide downwardly therealong to the bottoms thereof into sludge collecting and withdrawing means positioned therebelow.

7 Claims, 7 Drawing Figures

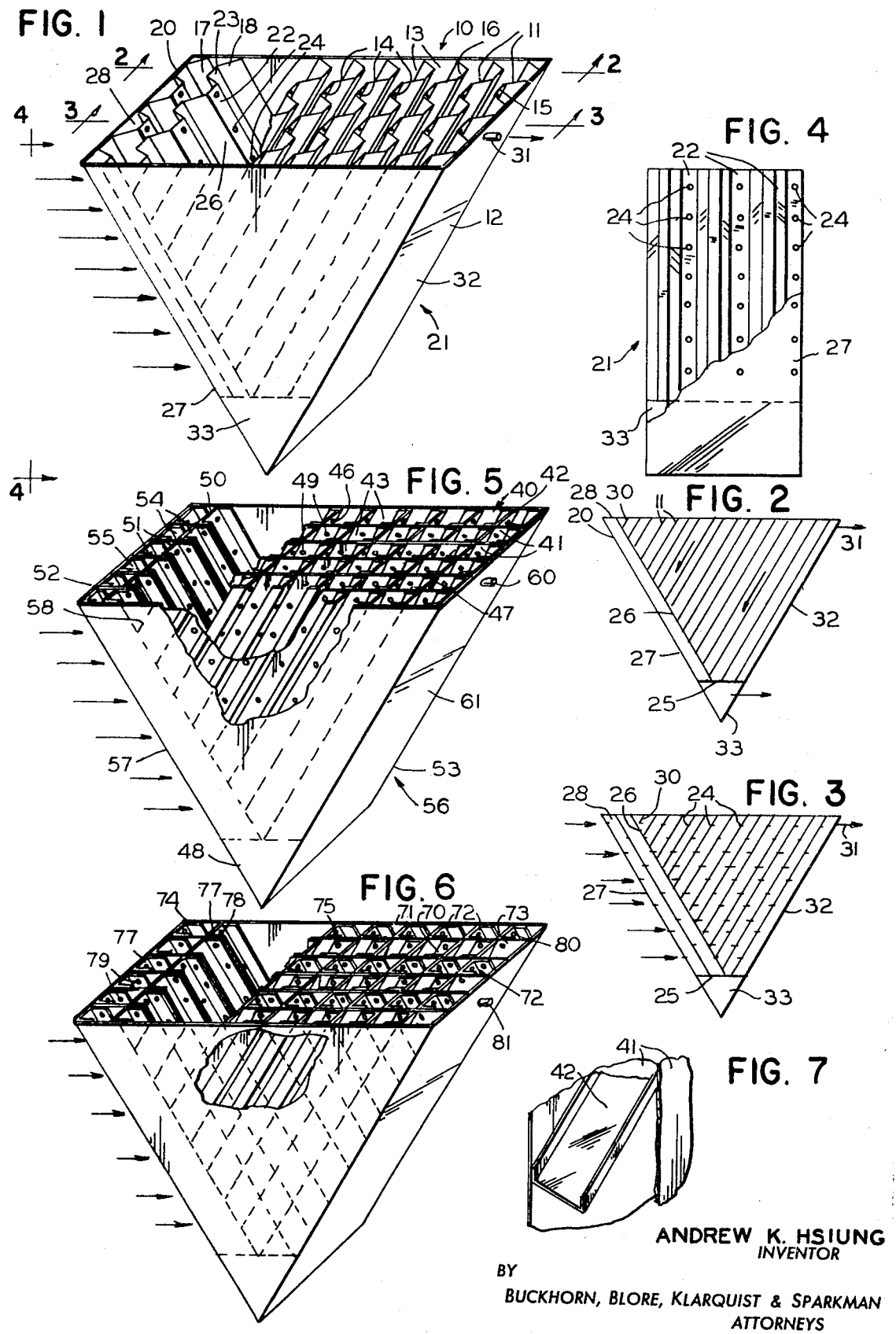

3,741,401

PERFORATED TUBE MODULE FOR LIQUID TREATMENT

BACKGROUND OF THE INVENTION

Where a liquid containing solid impurities passes at a slow rate through an inclined conduit of small cross secton, solid materials contained therein settle out on the conduit bottom. Such solids separate more rapidly when the conduit is inclined than if the liquid were permitted simply to stand in a settling tank. A multi-channel device applying this principle is disclosed in U. S. Pat. No. 3,491,892.

Accordingly, the primary object of the present invention is to provide a device for liquid treatment which will utilize the aforesaid principle and which will also efficiently provide for a continuous horizontal flow therethrough rather than for batch treatment therein.

A further object of the present invention is to provide such a device that will decrease the required time of detention of the liquid therein for an effluent of given quality.

A still further object of the present invention is to provide such a device which can be used for baffling and flocculation as well as for settling.

SUMMARY OF THE INVENTION

The apparatus of the present invention comprises a set of inclined channels selected from perforated partitions or walls. The kinetic energy of an influent liquid is rapidly dissipated as the liquid flows through the perforations while the solids suspended therein settle out on the inclined bottoms of the channels.

As such, the apparatus comprises a set of spaced apart, generally parallel sheets of material inclined to the horizontal, which sheets form a plurality of settling compartments for an influent liquid. Each of the sheets has a plurality of perforations therein.

Means are provided to distribute the influent liquid so that it impinges substantially uniformly on the first of the sheets and thereafter flows through the perforations therein into the first of the settling compartments and thence, uniformly and sequentially to the last compartment. Means to withdraw the effluent liquid from the last of the settling compartments are provided, and such withdrawal means are positioned adjacent the top of the last compartment. Thus the liquid flowing through the device flows upwardly through the settling compartments as well as sequentially from the first to the last thereof. Settleable particles settle out on the sheets as the liquid flows upwardly through the compartments, sliding therealong to the bottom of the device.

BRIEF DESCRIPTION OF THE DRAWINGS

FIG. 1 is a perspective view of a settling device constructed in accordance with the present invention.

FIG. 2 is a sectional view taken on line 2—2 of FIG. 1.

FIG. 3 is a sectional view taken on line 3—3 of FIG. 1.

FIG. 4 is a front view of the device of FIG. 1 taken on line 4—4 thereof.

FIG. 5 is a perspective view of a settling device constructed in accordance with a different embodiment of the present invention.

FIG. 6 is a perspective view of a settling device constructed in accordance with still another embodiment of the present invention.

FIG. 7 is a perspective view of a detail of construction of the embodiments of FIGS. 5 and 6.

DESCRIPTION OF THE PREFERRED EMBODIMENTS

Referring to the drawings, the apparatus of the present invention comprises a set 10 of spaced apart parallel corrugated sheets 11 of ABS, PVC, fiberglass, wood, metal or other rigid or semirigid materials mounted in a hopper shaped supporting structure 12. The sheets 11 are inclined to the horizontal at an angle of about 45° to about 75° and form settling compartments 13 for liquid therebetween. The sheets 11 are provided with a plurality of perforations 14 drilled or punched along the ridges 15 thereof, the valleys 16 being imperforate so as to permit particles which settle thereupon to slide therealong to the bottoms thereof. See FIG. 2. The structure 12 is adapted to be positioned in a settling tank (not shown).

A second set 17 of two spaced apart parallel corrugated sheets 18 made of the same material as the sheets 11 are positioned in the influent side 20 of the supporting structure 12. Sheets 18 are also inclined to the horizontal at an angle of from about 45° to about 75°, but in a direction opposite to the direction of inclination of the sheets 11. In the embodiment illustrated in FIG. 1, two such corrugated sheets 18 are provided in the set 17, but obviously the number can be varied. Sheets 18 together with sheets 11 form the wedge-shaped sludge hopper 21 shown.

The sheets 18 of the set 17, being corrugated, also comprise ridges 22 and valleys 23, and perforations 24 are drilled or punched along the ridges 22 only.

A preferred spacing between corrugated sheets in both sets 10 and 17 is about 2 inches. A preferred perforation diameter in both sheets 11 and 18 is about 1 inch with such perforations being spaced approximately three inches center to center and offset vertically or zigzagged with respect to the perforations on adjacent sheets. See FIG. 3.

It will be noted that the through 11 of the first set 10 uniformly decrease in length toward the influent side 20 of the hopper such that the bottoms 25 thereof approach the second sheet 26 of the set 17. In this manner, an influent flow of liquid introduced against the perforated forward wall 27 of the sludge hopper 21 is distributed uniformly across the compartments 28 formed by the sheets 18 and passes through the perforations 24 therein. Such influent flow thereafter impinges substantially uniformly on the first sheet 30 of the set 10 inasmuch as the perforations 24 in the sheets 18 of the second set 17 permit such influent flow to pass into the settling compartments 13 formed by the sheets 11 of the first set 10.

An orifice 31 to withdraw effluent is provided adjacent the top of the downstream side 32 of the hopper 21. By this means, the influent flow of liquid, after it flows through the perforations in the sheets 18 of the set 17 into the first of the settling compartments 13, flows upwardly through such compartments as it passes uniformly and sequentially from the first to the last. As the liquid flows upwardly through the inclined compartments 13, settleable particles settle out onto the valley portions 16 of the sheets 11, which valleys guide the particles as they slide therealong into a sludge collecting and withdrawal chamber 33 in the bottom of the hopper 21. See FIG. 2.

A settling device constructed in accordance with the present invention is considerably more efficient compared with standard upflow tube modules. Placing the instant device in mixed liquor in parallel with standard upflow tubes indicates the device of the present invention to be approximately twice as efficient as the standard upflow tube. Stated otherwise, a device according to the present invention will produce an effluent equal to that from the standard upflow tubes in half the detention time. Since the whole volume including the inlet and outlet sludge zones can be effectively utilized for settling purposes, the required detention time for liquid-solid separation can be markedly reduced.

In comparing a device according require the present invention with a standard upflow tube module in the thickening of mixed liquor in an aeration tank of a pilot activated sludge plant, the total tankage required per gallon of mixed liquor per minute was five cubic feet for 6,000 mg/l suspended solids, whereas 10 cubic feet were required for a standard 60° tube settler. A conventional unit would REQUIRE at least 20 cubic feet for the same treatment.

A device according to the present invention can be installed anywhere in an aeration tank without using mixed liquor transfer piping. Since the depth of the hopper can be as little as three feet, the depth of the basin is no problem. Installed in an existing basin, the device can be hung above the bottom without interfering with the existing sludge scraper. In an aerated lagoon, the hopper can be mounted on a float. The unit can function as an efficient clarifier as well as a thickener.

FIG. 5 illustrates a settling device constructed in accordance with a different embodiment of the present invention. There the unit comprises a first set 40 of spaced apart parallel vertical sheets 41 made of the same materials as the sheets 11 in the embodiment of FIG. 1. A preferred thickness, for example, is 0.010 inch thick polyvinyl chloride, a material suitable for this use being Union Carbide Corporation "Bakelite," VCA 3605 food packaging grade.

A plurality of channel shaped plastic baffles 42 are attached to adjacent ones of the vertical sheets 41 to form inclined settling compartments 43 through which the liquid upwardly flows. The baffles 42 are preferably inclined to the horizontal at an angle of about 45° to about 75° and are attached at right angles to the vertical sheets 41, thereby to form generally parallel sheets on which to receive settleble particles of material from the liquid. The baffles 42 may be made of any rigid or semirigid material and may, for example, comprise 0.025 inch extruded ABS plastic channel made of Uniroyal "Kralastic," MV 1801, National Sanitation Foundation quality for use in potable water. The baffles 42 are attached to the sheets 41 by a plastic solvent or other type of plastic adhesive. See FIG. 7.

Alternate baffles in the transverse direction of the unit are provided with a plurality of perforations 46 drilled or punched therein, the imperforate baffles 47 functioning as receiving sheets to permit particles which settle thereupon to slide therealong to a sludge collecting and withdrawal chamber 48 at the bottom of the unit.

Again, a preferred spacing between baffles 42 in the direction of flow through the unit is about 2 inches. A preferred spacing between vertical sheets 41 is also two inches. The vertical sheets 41 are themselves provided with perforations 49 providing for transverse flow through each compartment 43. A preferred perforation diameter for both the sheets 41 and baffles 42 is about one inch with such perforations being spaced vertically approximately three inches center to center. Perforations 46 in baffles 42 are offset vertically or zigzagged with respect to perforations in adjacent baffles in the direction of flow. Again, see FIG. 3.

An influent distributing means in the form of a second set 50 of perforated parallel vertical sheets 51 made of the same material as the sheets 41 is positioned in the influent side 52 of the supporting structure 53. Channel shaped plastic baffles 54 similar to baffles 42 are attached to adjacent ones of the vertical sheets 51 to form compartments 55. The baffles 54 are also inclined to the horizontal at an angle of from about 45° to about 75°, but in a direction opposite the direction of inclination of the baffles 42. In the embodiment illustrated in FIG. 5, two such rows of baffles 54 are provided, but obviously the number can vary. The entire assembly forms a sludge hopper 56 as shown.

The operation of the hopper 56 illustrated in FIG. 5 is similar to that of FIG. 1. An influent flow of liquid introduced against the perforated forward wall 57 of the hopper 56 is distributed uniformly across the compartments 55 by the baffles 54 and vertical sheets 51, passing through the perforations therein. Such influent flow thereafter impinges substantially uniformly on the first row 58 of baffles 42 of the set 40 and thereafter passes into the first row of settling compartments 43 thereof and thence sequentially, from settling compartment to settling compartment in the direction of flow through the hopper.

An orifice 60 to withdraw effluent is provided adjacent the top of the downstream side 61 of the hopper. By this means, the infuent flow of liquid, after it flows through the baffles 42 into the first of the settling compartments 43, flows upwardly throuh such compartments as it passes uniformly and sequentially from the first to the last. As the liquid flows upwardly through the inclined compartments 43, settleable particles settle out onto the imperforate baffles 47, which guide the particles as they slide therealong into the sludge collecting and withdrawal chamber 48 in the bottom of the hopper.

FIG. 6 illustrates a settling device constructed in accordance with still another embodiment of the present invention. The construction is similar to that of FIG. 5 with the exception that alternate baffles 70 in the transverse direction of the hopper 71 are inclined in a direction opposite to the inclination of the adjacent baffles 72. Thus the baffles 70 and 72 and the attached vertical parallel sheets 73, even when comprising a semirigid material of the nature of the plastics heretofore named, form a rigid truss-like structure which has substantial structure strength enabling it to be self supporting.

It will be noted that the baffles 74, which comprise the distributing means for influent liquid flow, are inclined to the horizontal in a direction parallel to the direction of inclination of the baffles 72 in the settling set and opposite to the direction of inclination of the adjacent baffles 70 in such set. Each of the vertical sheets 73 is provided with a plurality of perforations 75 therein to provide for transverse flow through the unit. However, only alternate baffles 77 of the influent liquid distributing set are provided with perforations 78, the adjacent ones 79 being imperforate. The baffles 72 of the settling set are correspondingly provided with perforations 80 to provide for flow through the unit in the direction of flow of the liquid, the baffles 70 which are inclined in the opposite direction to the baffles being imperforate. An orifice 81 is provided adjacent the top of the unit. The operation is in all respects similar to that of the hoppers of FIGS. 1 and 5.

I claim:

1. Apparatus for effecting separation of settleable particles from a liquid, comprising
    support means;
    a first set of each of apart, generally parallel sheets of a material selected from the class consisting of rigid and semi-rigid materials and inclined to the horizontal at an angle of from about 45° to about 75°, said sheets being disposed in said support means and forming a plurality of settling compartments for said liquid, each of said sheets having a plurality of perforations therein, said support means being adapted to be positioned in a settling tank;
    means disposed within said support means for distributing an influent flow of liquid so that it impinges substantially uniformly on the first of said sheets and thereafter flows through said perforations therein into the first of said settling compartments and thence, uniformly and sequentially to the last thereof,
    said distributing means comprising
    a second set of spaced apart, generally parallel sheets of a material selected from the class consisting of rigid and semi-rigid materials and inclned to the horizontal at an angle of from about 45° to about 75°, said sheets being inclined in a direction opposite to the direction of inclination of said sheets of said first set, said sheets of said second set having a plurality of perforations therein, said perforations communicating with said settling compartments formed by said sheets of said first set, whereby said influent flow may pass through said sheets of said second set and into said settling compartments formed by said sheets of said first set;
    effluent liquid withdrawal means positioned in said support means adjacent the top thereof and downstream of said last of said settling compartments formed by said sheets of said first set, whereby said liquid flows upwardly through said settling compartments as it passes sequentially from said first to said last thereof, said sheets being adapted to receive said settleable particles of material from said liquid as said particles settle out of said liquid in said compartments and to guide said particles as they slide therealong to the bottoms thereof; and
    means positioned below said sheets for collecting and withdrawing said particles.

2. Apparatus as in claim 1 in which said sheets of said first set comprise a plurality of corrugated sheets, each of said sheets comprising a plurality of ridges and valleys, said perforations in said sheets of said first set being disposed only on said ridges thereof.

3. Apparatus as in claim 2 in which said sheets of said second set comprise a plurality of corrugated sheets, each of said sheets comprising a plurality of ridges and valleys, said perforations in said sheets of said second set being disposed only on said ridges thereof.

4. Apparatus as in claim 1 further comprising
    a plurality of spaced apart, parallel vertical sheets of a material selected from the class consisting of rigid and semi-rigid materials, said sheets extending at right angles to said sheets of said first set.

5. Apparatus as in claim 4 in which said vertical sheets are perforated sheets.

6. Apparatus as in claim 1 in which said perforations in adjacent sheets of said first set are offset vertically with respect to each other.

7. Apparatus for effecting separation of settleable particles from a liquid, comprising
    support means;
    a plurality of at least three spaced-apart parallel vertical sheets of a material selected from the class consisting of rigid and semi-rigid materials disposed in said support means, said sheets having a plurality of perforations therein;
    a eeast two sets of inclined spaced-apart parallel baffles of a material selectedfrom the class consisting of rigid and semi-rigid materials joining adjacent ones of said sheets to form inclined channels, said baffles comprising planar sheets, each set of said baffles being inclined in a direction opposite to the direction of inclination of the adjacent set of baffles, alternate sets of said baffles having a plurality of perforations therein;
    means disposed within said support means for distributing an influent flow of liquid so that it impinges substantially uniformly on the first of said baffles in each of said sets and thereafter flows through said perforations therein into the first of said inclined channels and thence, sequentially to the last thereof,
    said distributing means comprising
    a plurality of spaced-apart parallel sheets of material selected from the class consisting of rigid and semi-rigid materlals and inclined to the horizontal in a direction parallel to the direction of inclination of one of said two sets of parallel baffles and opposite to the direction of inclination of the other of said two sets of parallel baffles,
    said last named sheets having a plurality of perforations therein, said perforations communicating with said inclined channels formed by said two sets of baffles, whereby said influent flow may pass through said perforations in said last named sheets and into said inclined channels;
    effluent liquid withdrawal means positioned in said support means adjacent the top thereof and downstream of said last of said inclined channels, whereby said liquid flows upwardly through said channels as it passes sequentially from said first to said last thereof, said baffles being adapted to receive said settleable particles of material from said liquid as said particles settle out of said liquid in said channels and to guide said particles as they slide therealong to the bottoms thereof; and
    means positioned below said baffles for collecting and withdrawing said particles.

* * * * *